(12) United States Patent
Cotignola et al.

(10) Patent No.: US 7,805,137 B2
(45) Date of Patent: Sep. 28, 2010

(54) CORDLESS TELEPHONE SYSTEM WITH IP NETWORK APPLICATION

(75) Inventors: Christopher J. Cotignola, Doylestown, PA (US); Dipak R. Patel, Hatboro, PA (US)

(73) Assignee: General Instrument Corporation, Horsham, PA (US)

( * ) Notice: Subject to any disclaimer, the term of this patent is extended or adjusted under 35 U.S.C. 154(b) by 631 days.

(21) Appl. No.: 11/740,690

(22) Filed: Apr. 26, 2007

(65) Prior Publication Data

US 2008/0268879 A1     Oct. 30, 2008

(51) Int. Cl.
*H04W 4/00* (2009.01)
(52) U.S. Cl. .................................. 455/426.1; 370/356
(58) Field of Classification Search .................. 455/403, 455/462–466, 426.1; 370/352, 401, 389, 370/431; 379/142.01, 215.01
See application file for complete search history.

(56) References Cited

U.S. PATENT DOCUMENTS

| | | | | |
|---|---|---|---|---|
| 6,556,586 B1 * | 4/2003 | Sipila | ........................ | 370/469 |
| 6,611,516 B1 * | 8/2003 | Pirkola et al. | ................ | 370/352 |
| 6,788,953 B1 * | 9/2004 | Cheah et al. | ............. | 455/550.1 |
| 7,310,329 B2 * | 12/2007 | Vieri et al. | .................. | 370/352 |
| 7,319,857 B2 * | 1/2008 | Baldwin et al. | ........... | 455/412.1 |
| 7,403,604 B2 * | 7/2008 | Mundra et al. | .......... | 379/142.02 |
| 7,492,872 B1 * | 2/2009 | Di Carlo et al. | .......... | 379/88.12 |
| 7,542,554 B2 * | 6/2009 | Binder | .................... | 379/90.01 |
| 2002/0072395 A1 * | 6/2002 | Miramontes | ................ | 455/566 |
| 2004/0125819 A1 * | 7/2004 | Binder | ....................... | 370/463 |
| 2004/0132500 A1 * | 7/2004 | Rogalski et al. | .......... | 455/569.1 |
| 2004/0185917 A1 * | 9/2004 | Fischedick et al. | .......... | 455/574 |
| 2005/0078612 A1 * | 4/2005 | Lang | .......................... | 370/260 |
| 2005/0117564 A1 * | 6/2005 | Vieri et al. | ................... | 370/352 |
| 2005/0197061 A1 * | 9/2005 | Hundal | ...................... | 455/41.2 |
| 2005/0238003 A1 * | 10/2005 | Becker et al. | ................ | 370/352 |
| 2006/0003741 A1 * | 1/2006 | Becker et al. | ............. | 455/412.2 |
| 2006/0068762 A1 * | 3/2006 | Baldwin et al. | .......... | 455/412.1 |
| 2006/0251051 A1 * | 11/2006 | Bhatt et al. | .................. | 370/352 |
| 2007/0076697 A1 * | 4/2007 | Huotari et al. | .............. | 370/352 |
| 2007/0105548 A1 * | 5/2007 | Mohan et al. | ............. | 455/426.1 |
| 2007/0286174 A1 * | 12/2007 | Brannan et al. | ............. | 370/356 |
| 2008/0003952 A1 * | 1/2008 | Sjostrom et al. | ........... | 455/74.1 |
| 2008/0123670 A1 * | 5/2008 | Mundra et al. | .............. | 370/401 |
| 2008/0162710 A1 * | 7/2008 | Mundra et al. | .............. | 709/230 |
| 2008/0200212 A1 * | 8/2008 | Morrill et al. | ............... | 455/566 |

* cited by examiner

*Primary Examiner*—Jean A Gelin
*Assistant Examiner*—Nathan Taylor
(74) *Attorney, Agent, or Firm*—Larry T. Cullen

(57) ABSTRACT

A cordless telephone system includes a base station operable to connect to an internet protocol (IP) network and at least one handset running a short messaging service (SMS) application. The at least one handset is operable to transmit and receive both voice data and SMS data to and from the base station. The voice data is transmitted from the base station via a multimedia terminal adapter (MTA) to the IP network and the SMS data is transmitted from the base station via a modem to the IP network.

15 Claims, 6 Drawing Sheets

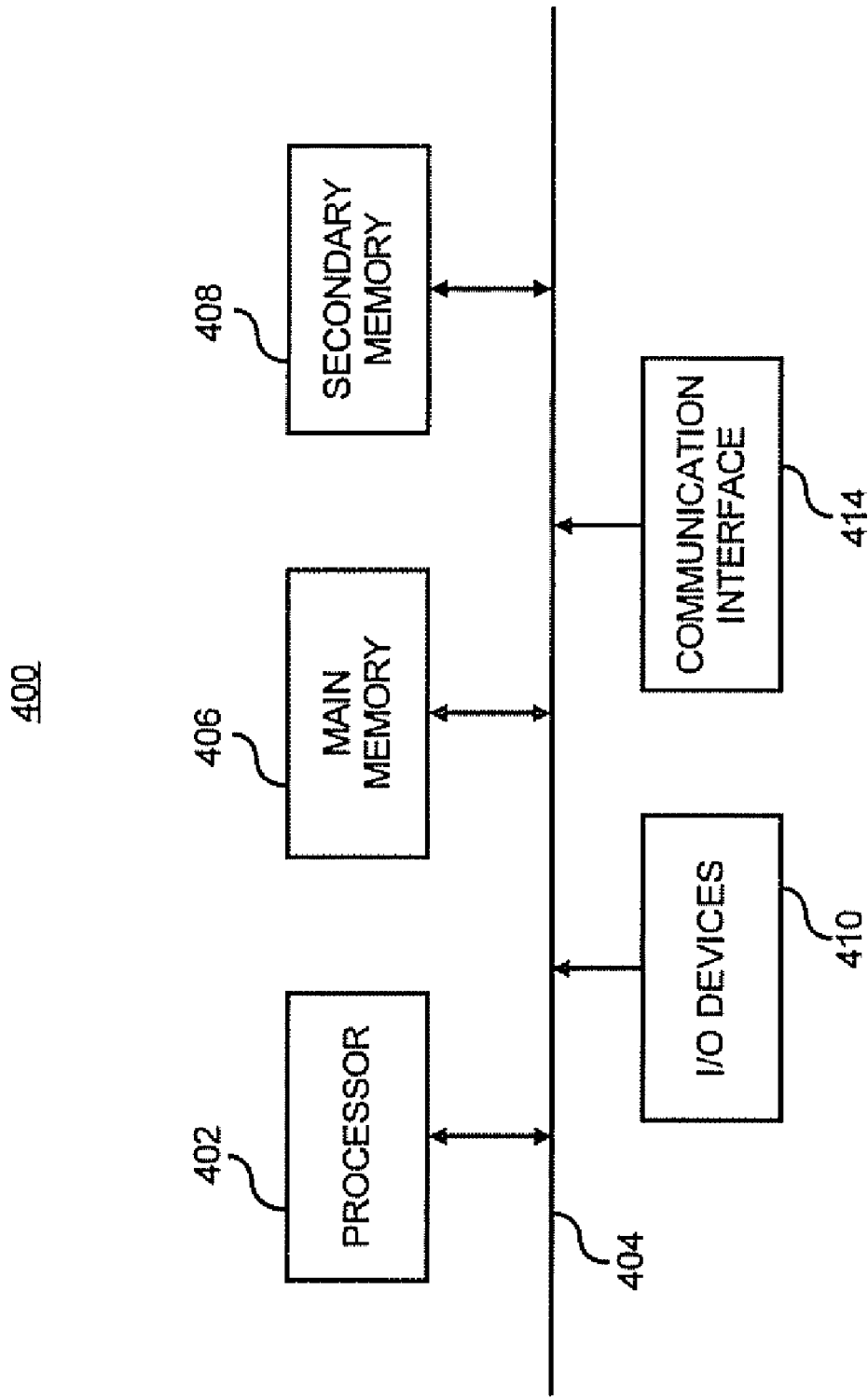

CORDLESS TELEPHONE SYSTEM WITH IP NETWORK APPLICATION

FIELD OF INVENTION

Disclosed herein are various embodiments relating to cordless telephone systems. More particularly, the various embodiments are directed to cordless telephone systems that may run Internet Protocol (IP) applications.

BACKGROUND

Voice over Internet Protocol (VoIP) is increasingly becoming the standard means of communication for many homes and business. VoIP systems utilize computers and/or specially adapted telephones to communicate over an IP network, such as the Internet. FIG. 1 illustrates a simplified view of a VoIP system 100 including a first and second computer 102 and 108 and a first and second telephone 110 and 114. The first computer 102 may be a personal computer, such as a desktop or laptop, having at least an voice input device, such as a microphone, and software for processing the voice input. The first computer 102 may connect to an IP network 106, such as the Internet, through a cable modem 104, as is known in the art. Voice data may then be sent from the first computer 102 over the IP network 106 to either a second computer 108 or a second telephone 114, both of which may present the voice data to a user.

Alternatively, a standard telephone configured to function on a plain old telephone service (POTS) network, such as the first telephone 110, may be used in the VoIP system 100. The first telephone 110 may connect to the IP network 106 through a phone adapter 112, or a device capable of processing the voice data received by the first telephone 110 for transmission over the IP network 112. Therefore, the first telephone 110 may transmit voice data to either the second computer 108 or the second telephone 114. However, the first telephone 110 may only transmit voice data over the IP network 106, because the phone adapter 112 lacks the capability to process and transmit other forms of data.

The use of conventional telephones, such as the first and second telephones 110 and 114, as opposed to a computer, in VoIP systems is particularly promising because the overwhelming majority of consumers utilize POTS networks offered by traditional telephone service providers. Thus, consumers are familiar and comfortable with the use of conventional telephones and only need a minimum amount of additional hardware, such as the phone adapter 112, to transition from a POTS network to a VoIP system. Moreover, conventional telephones are smaller, portable, and more convenient than a computer.

However, conventional telephones do not take advantage of the full potential offered by the IP network 112 of the VoIP system 100. For example, while the phone adapter 112 allows for the transmission of voice data over the IP network 106, the phone adapter 112 cannot process other forms of data, such as text and images. Therefore, the current use of conventional telephones in VoIP systems is limited.

Late model cellular phones have begun to utilize internet applications, however, cellular phones suffer from several drawbacks. One such drawback is the reliance on cellular towers, which often provide spotty and inconsistent reception.

SUMMARY OF INVENTION

A cordless telephone system may include a base station, which is operable to connect to an internet protocol (IP) network. The cordless telephone system may also include at least one handset running a short messaging service (SMS) application, such as an instant messaging or text messaging application. The handset is operable to transmit and receive both voice data and SMS data generated by the SMS application to and from the base station. The voice data is transmitted from the base station via a multimedia terminal adapter (MTA) to the IP network and the SMS data is transmitted from the base station via a modem to the IP network.

A method of transmitting the SMS data over a cordless telephone system includes running the SMS application on the handset of the cordless telephone system and generating the SMS data with the SMS application running on the handset. The SMS data may be transmitted from the handset to a base station for the handset and from the base station to a modem in connection with the base station. The modem may transmit the SMS data to an IP network.

The base station includes the MTA, which is operable to transmit and receive voice data over the IP network and the modem, which is operable to transmit and receive the SMS data over the IP network. The base station also includes a routing module, which is operable to receive the voice and SMS data from a plurality of handsets and route the voice data to the MTA and the SMS data directly to the modem.

The handset includes the SMS application running on the handset. The handset is operable to generate the SMS data with the SMS application and transmit voice data and the SMS data to the base station. The handset may also include a display device for displaying SMS data to a user.

BRIEF DESCRIPTION OF THE DRAWINGS

Various features of the embodiments described in the following detailed description can be more fully appreciated when considered with reference to the accompanying figures, wherein the same numbers refer to the same elements.

FIG. 4 illustrates a block diagram of an electronic platform, according to an embodiment.

DETAILED DESCRIPTION

Figure 1:
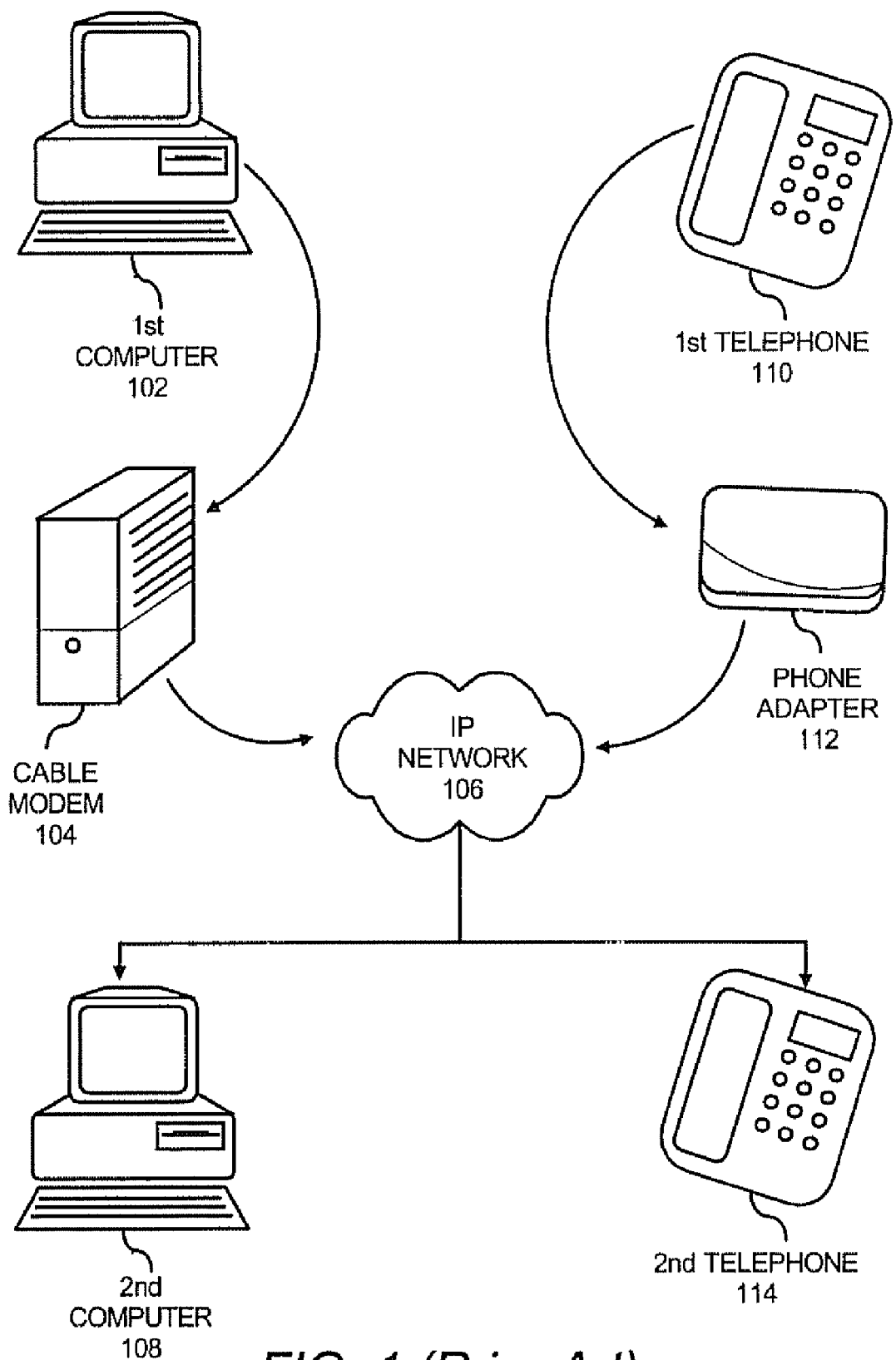
FIG. 1 illustrates a prior art VoIP system.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

According to an embodiment, a cordless telephone system is operable to transmit and receive voice and Internet Protocol (IP) data and run IP applications, such as one or more short messaging service (SMS) applications, on the handsets and/or the base station. The term "telephone," as used herein, refers to an electronic device designed for the primary purpose of transmitting and/or receiving voice data. Voice data refers to speech and other sounds for transmission over a VoIP network, which may be captured by a microphone or other similar device. For example, voice data includes the spoken words of a user. IP data refers to any form of data other than voice data, such as textual information and images. For example, IP data may include SMS data, photographs, text documents, and e-mail. SMS data includes text messages and instant messages (IM), as is known in the art. The IP network used to transmit the voice and IP data refers to any IP network, such as the Internet, and includes wired, wireless, local area networks (LAN), etc.

The cordless telephone system includes one or more handsets and a base station. The handsets are operable to run an IP application, such as an SMS client. SMS includes text messaging and instant messaging applications and an SMS client may include a client performing text messaging and/or instant messaging at the handset. The telephone system may be cordless in the sense that one or more portable handsets operate without being physically connected to a base station. The portable handsets may communicate with each other and with the base station via wireless transmission, such as radio transmissions, which will be discussed in greater detail below.

The cordless telephone system may be part of a VoIP system by interfacing with an IP network through a separate IP device, such as the phone adapter 112 or a multimedia terminal adapter (MTA), as will be discussed in greater detail below. Alternatively, the cordless telephone system may have IP interface circuitry, such as an embedded multimedia terminal adapter (MTA), integrated into the base station. The cordless telephone system may also have the ability to interface with, and communicate over, a traditional POTS network, such a PSTN or "twisted pair."

The cordless telephone system described in the embodiments herein has several advantages over prior art telephones. By incorporating IP applications into the cordless telephone system, users have the ability to communicate with each other using an IP application or via telephone using a single device. Furthermore, the cordless telephone system may be cheaper to use than a cellular phone and may have better quality of service than a cellular phone.

Figure 2A:
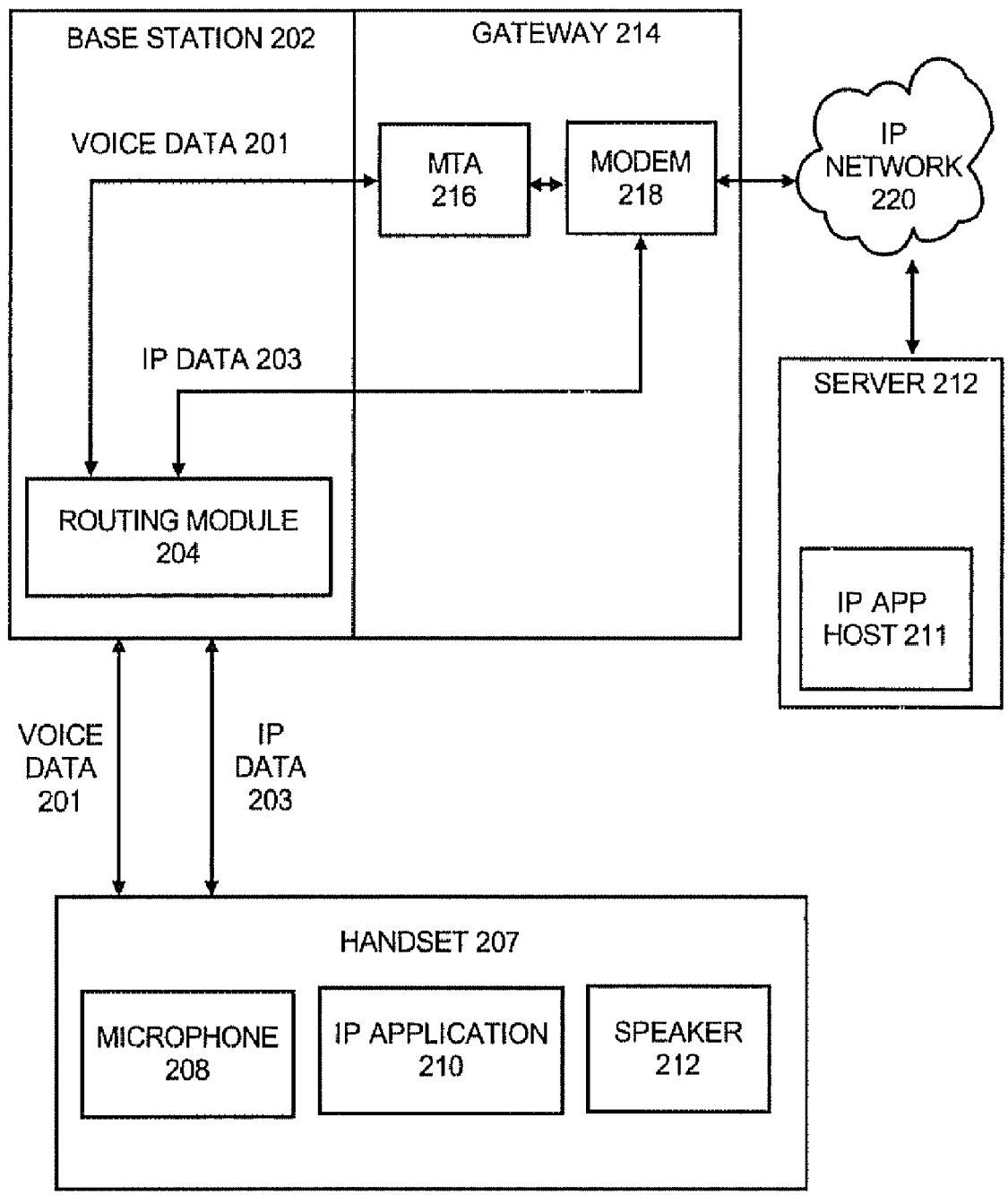
FIG. 2A illustrates a cordless telephone system for transmitting voice data and IP data, according to an embodiment.

FIG. 2A illustrates a block diagram of a cordless telephone system 200 for transmitting voice data 201 and IP data 203, according to an embodiment. The telephone system 200 includes a base station 202 having a handset 207, where the base station 202 is in connection with a gateway 214. The telephone system 200 may include a conventional cordless telephone capable of operating on a POTS network but is also operable to transmit and receive VoIP and IP data via the gateway 214. While the telephone system 200 is depicted in FIG. 2A as having only one handset 207, a person having ordinary skill in the art will appreciate that the telephone system 200 may have more than one handset 207. That is, the base station 202 may be configured to communicate and process data received from, and sent to, multiple handsets.

The handset 207 may include components found in the handsets of conventional cordless phones, such as a microphone 208 for receiving voice data 208 and a speaker 212 for presenting voice data. The handset 207 may have a number of components not illustrated in FIG. 2A. For example, the handset 207 may have a number pad for entering telephone numbers, as is known in the art. The number pad may also include letters, similar to conventional telephone number pads. In one embodiment, the handset 207 may have a keyboard, such as a "QUERTY" keyboard or any other format, for entering alpha-numeric characters.

As FIG. 2A depicts, the handset 207 includes an IP application 210. The IP application 210 may be a program configured to receive IP data from a user, the base station 202, and/or another handset. The IP application 210 may also be configured to transmit the IP data 203 to the base station 202 and/or to another handset. For example, the IP application 210 may include an SMS application, such as text messaging and instant messenger programs. A person having ordinary skill in the art will appreciate that many different SMS applications are known and used and that the IP application 210 may include any SMS application. In another example, the IP application 210 may be a browser, such as an Internet browser. The IP application 210 may be downloaded from the IP network 220, which will be described in greater detail below. The IP application 210 may also be preinstalled on the handset 207 or may be downloaded to the handset 207 from a memory device, such as a flash drive. The IP application 210 may interface with the number pad or keyboard of the handset 207 to receive alpha-numeric characters entered by a user for an SMS message. The SMS message, which is represented by the IP data 203, is sent to the base station 202, as indicated by the arrow between the base station 202 and the handset 207. The SMS message may also be sent to another handset 207 (not shown), and described in further detail below.

The handset 207 may include a display (not shown). The display may be any device for presenting visual information. The IP application 210 may interface with the display to present IP data 203 to a user. For example, the handset 207 may receive an instant message as IP data 203 from the base station 202 and may present the instant message on the display to be read by a user.

As set forth above, the handset 207 may send/receive data to/from the base station 202. The telephone system 200 may utilize radio frequency (RF) signals, such as DECT 6.0 protocol, for communications between the base station 202 and the handset 207, hence providing a cordless telephone system. Alternatively, or in addition thereto, the telephone system 200 may use other forms of wireless communication, such as infrared (IR). In an embodiment, the handset 207 may have the ability to connect directly to the base station 202 via a wire, cable, cord, etc., or by direct physical contact between the handset 207 and the base station 202. For example, the base station 202 may be configured to act as a "cradle" to receive and provide power to the handset 207. When connected to the base station 202 in the manner described in this example, the handset 207 may send and receive both voice data 201 and IP data 203 to/from the base station 202. However, the primary mode of operation is a wireless connection between the handset 207 and the base station 202.

The base station 202 may be a combination of hardware and software for receiving data, such as the voice data 201 and the IP data 203, from the handset 207 and sending data to the handset 207. The base station 202 may also send/receive voice data 201 and IP data 203 to/from the gateway 214. The base station 202 may be similar to base stations used in conventional cordless telephones, however, the base station 202 also includes, at least, a routing module 204. The routing module 204 may be hardware, software, or a combination of hardware and software for distinguishing between, and routing, different types of data. For instance, the routing module 204 may distinguish between the voice data 201 and the IP data 203 received from the handset 207. The routing module 204 may route the different types of data to different locations within the gateway 214, as will be discussed in greater detail below.

The gateway 214 is a device including hardware, software, and/or the combination of hardware and software for processing and transmitting data between the base station 202 and an IP network 220. The gateway 214 includes an MTA 216 and a modem 218. The MTA 216, as is known in the art, allows voice data 201 received from a telephone to be processed and transmitted over an IP network 220. The MTA 216 may receive voice data 201 from the IP network 220 or the base station 202 to allow a user's voice to be transmitted over the IP network 220 or received from the IP network and presented to a user via the speaker 212. The MTA 216 illustrated in FIG. 2A is an embedded MTA (EMTA), because the MTA 216 is embedded in the gateway 214.

The modem 218 allows IP data 203 to be transmitted over the IP network 220, as is known in the art. For example, the modem 218 may receive an instant message generated by the IP application 210 and routed through the routing module 204. The modem 218 may transmit this instant message over the IP network 220. The modem 218 may also receive IP data 203, such as the instant message, from the IP network 220 and transmit the IP data 203 to the handset 207 via the base station 202 for presentation at the handset 207. Although not illustrated in FIGS. 2A and 2B, the modem 218 may also contain a routing module for distinguishing between voice data 201 and IP data 203 received from the IP network 220. For example, the routing module in the modem 218 may be similar, or identical, to the routing module 204 in the base station 202. Thus, the routing module in the modem 218 may bypass the MTA 216 and route IP data 203 directly to the base station 202 or the handset 207.

Figure 2B:
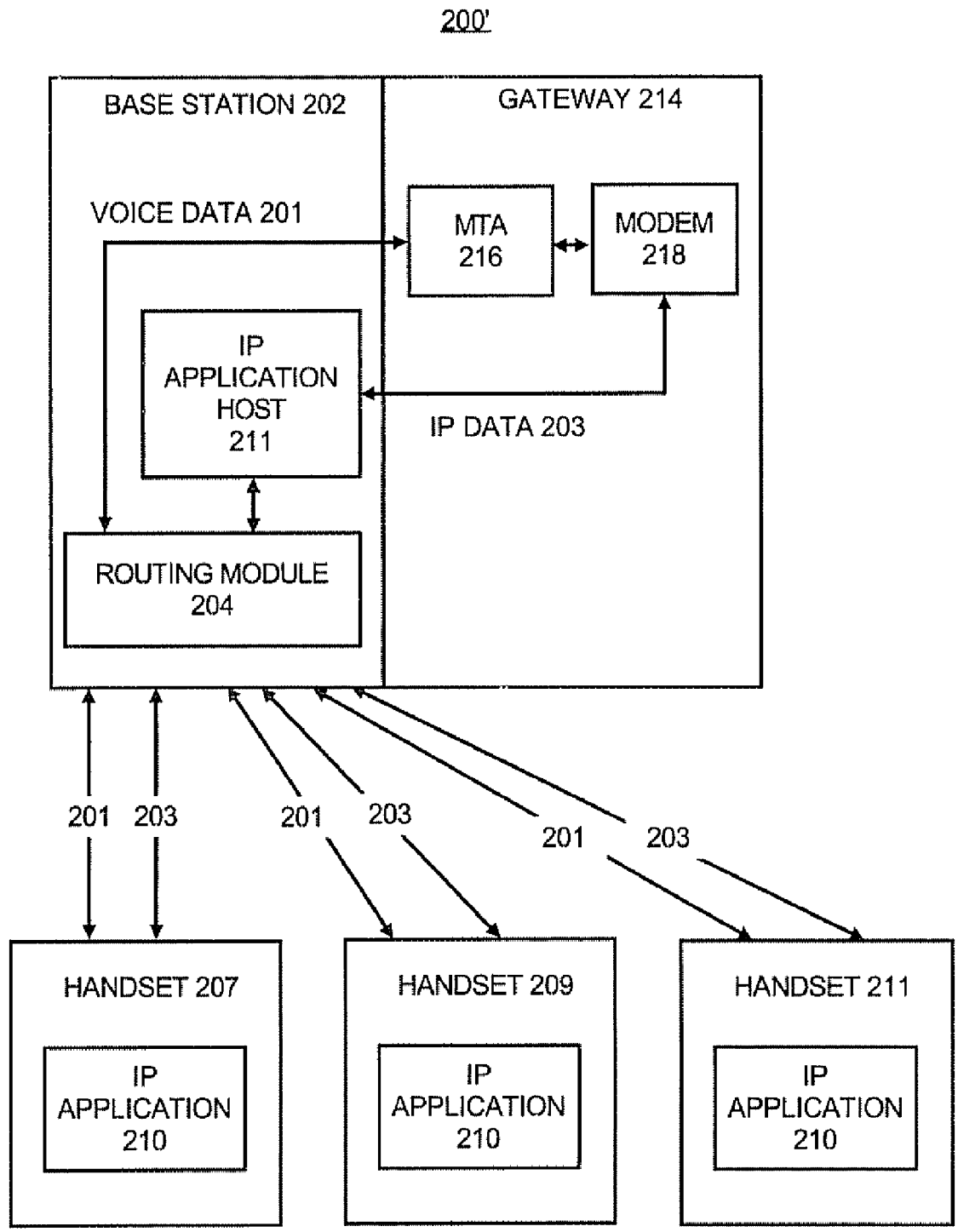
FIG. 2B illustrates a cordless telephone system for transmitting voice data and IP data, according to another embodiment.

While FIGS. 2A and 2B illustrate only two components of the gateway 214, a person having ordinary skill in the art will appreciate that the gateway 214 may contain many more components. The base station 202 and the gateway 214 may be separate components and may communicate with each other via a wire, such as through a universal serial bus (USB) connection, pulse code modulation/time division multiplex (PCM/TDM) interface coupled with a universal asynchronous receiver/transmitter (UART), 10/100 Ethernet, RF-11 ports, etc., or wirelessly, through RF signals, etc. The base station 202, the MTA 216, and the modem 218 may also be separate and distinct components, or they may be combined in any combination. For example, the MTA 216 may be integrated into the base station 202, while the modem 218 is a separate and distinct piece of hardware. However, in another embodiment, the base station 202 and the gateway 214 may be a single integrated component and may, therefore, communicate along a common bus. Whether the base station 202 and the components of the gateway 214 are separated or integrated, the format of the voice data 201 may be common between both the base station 202 and the gateway 214. For example, the format of the voice data 201 may be 16-bit linear PCM.

The base station 202 and the gateway 214 may transmit and receive both voice data 201 and IP data 203 simultaneously there between. Similarly, the handset 207 and the base station 202 may also transmit and receive both voice data 201 and IP data 203 simultaneously there between. That is, the IP data 203 may be transmitted or received while the handset 207 is connected to another user via a telephone call. Therefore, when the handset 207 is transmitting or receiving voice data 201 over a VoIP connection, the handset 207 may also transmit or receive IP data 203.

Alternatively, both the base station 202 and the gateway 214 and the handset 207 and the base station 202, respectively, may transmit and receive both voice data 201 and IP data 203 separately and independently from the other form of data. In fact, the IP data 203 may be sent and received without first establishing a telephone call for the transmission of voice data 201. In this sense, the telephone system 200 is always "on." That is, a user may send and receive IP data 203, such as an instant message, through the IP application 210 without being connected to another user via a telephone call. In this embodiment, a user needs only to log onto the IP application 210, such as an instant messenger application, using the handset 207 to transmit or receive the IP data 203. Therefore, the IP data 203 may then be sent to, and received from, the handset 207 without the user first dialing a telephone number to establish a VoIP connection. In this manner, the user may interact with the IP application 210 from the handset 207 as if the user were using a personal computer. However, the handset 207 provides the user with the ease of use and mobility offered by traditional telephones.

The IP network 220 may include the Internet or other public and private networks. The IP network 220 may be connected to any number of telephone systems and computing systems, including a server 212. The server 212 is any computing device capable of communicating with the IP network 220 and having an IP application host 211. For example, the server 212 may be a network sever hosting an instant messaging service. Therefore, a user may access the IP application host 211 by interfacing with the IP application 210 on the handset 207. In this manner, the handset 207 is similar to a personal computer.

As set forth above, the telephone system 200 may include more than one handset 207. In this embodiment, each handset 207 may independently and concurrently access the IP network 220 in the manner described above. That is, each handset 207 may have its own path to the IP network 220. Moreover, each handset 207 may send and receive both voice data 201 and IP data 203 to/from the other handsets. The handsets may communicate with each other in different manners. For example, the handset 207 may utilize its path through the IP network 220 to send IP data 203 out to the IP network 220 to, for example, the server 212 running the IP application host 211. The server 212 may then transmit the IP data 203 back through the IP network 220 to the gateway 214 and, ultimately, to another handset operating on the base station 202.

FIG. 2B illustrates a block diagram of a cordless telephone system 200' for transmitting voice data 201 and IP data 203, according to another embodiment. The telephone system 200 includes the base station 202, the gateway 214, and the handset 207, as described above with respect to FIG. 2A. Although not illustrated in FIG. 2B, the gateway 218 may be in connection with the IP network 220, as described above. However, the telephone system 200 includes two additional handsets 209 and 211, which may be similar, or identical, to the handset 207. Therefore, the handsets 209 and 211 each have the IP application 210. Moreover, in the embodiment depicted in FIG. 2B, the IP application host 211 is contained in the base station 202. In this manner, the IP application, such as an instant messaging service, may be isolated to the number of handsets configured to interact with the base station 202. This particular embodiment may find utility within corporations where reliability and security of IP applications are required. For example, a large corporation may want its employees to communicate over an internal instant messaging system so that corporate communications cannot be intercepted by outside entities.

Although not illustrated in FIG. 2B, the modem 218 may include a routing module similar to the routing module 204, as described above. Thus, the routing module in the modem

218 may bypass the MTA 216 and route IP data 203 directly to the IP application host 211 or one or more of the handsets 207, 209, and 211.

Figure 3A:
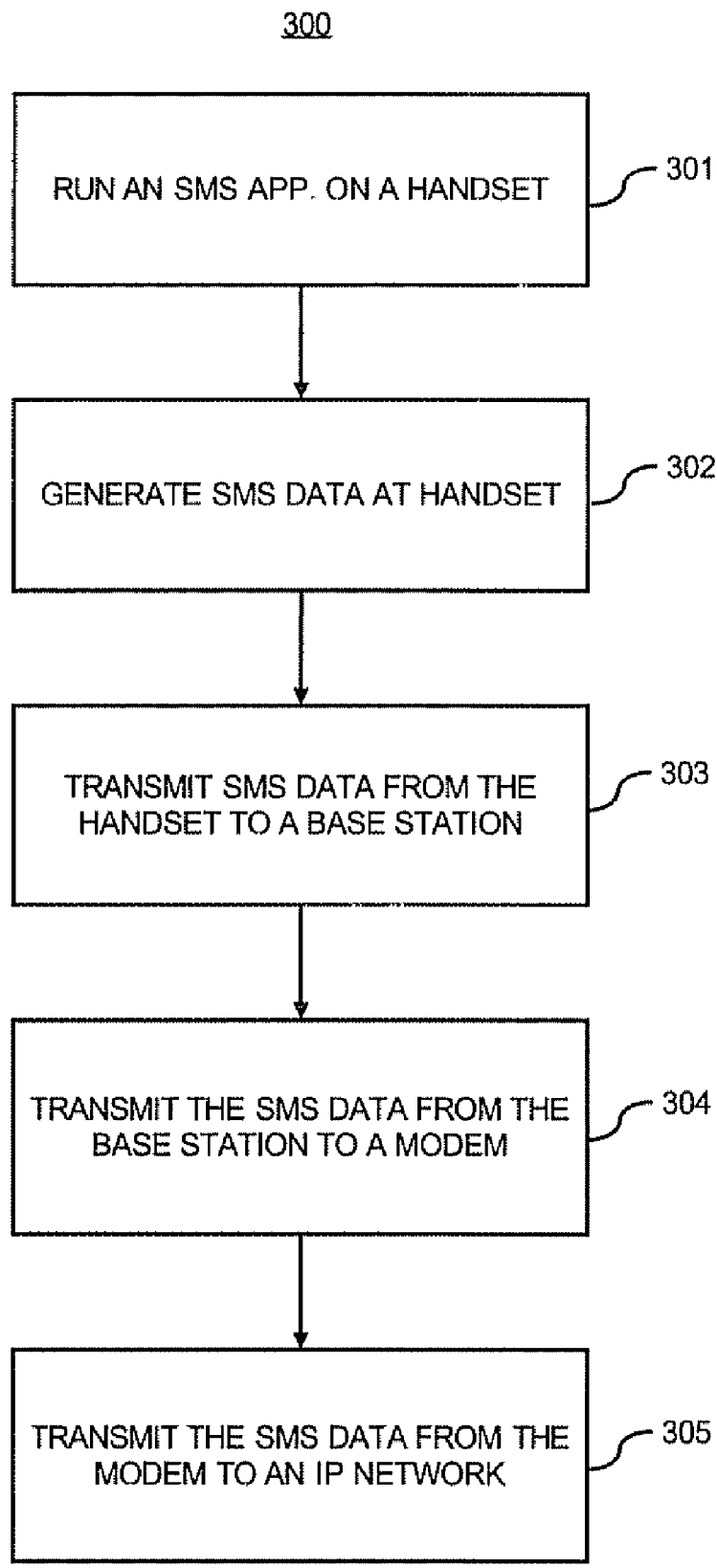
FIG. 3A illustrates a flow chart of a method for transmitting IP data over an IP network using a telephone, according to an embodiment.

FIG. 3A depicts a flow chart of an illustrative method 300 for transmitting SMS data from a cordless telephone system. The method 300 is described with respect to FIGS. 2A and 2B by way of example and not limitation and it will be apparent that the method 300 may be used in other systems. Moreover, it will also be apparent to a person having ordinary skill in the art that certain steps in the method 300 are optional and, similarly, that additional steps may be inherent or added to the method 300.

At step 301, an SMS application is run on the handset 207. For example, the SMS application may be the IP application 210, such as an instant message or text message application, which allows a user to send and receive IM and text messages. The SMS application may be a client application communicating with the IP host application 211. Thus, the IP host application 211 may include an SMS host.

At step 302, SMS data is generated at the handset 207 by the SMS application running on the handset 207. For example, the user may enter alpha-numeric characters on a keyboard associated with the handset 207 to generate IM and text messages. Although not illustrated, a telephone connection for transmitting voice data 201 may be made either prior to, or after, the generation of the SMS data. For example, a user may dial the phone number of another telephone to establish a telephone call. Therefore, voice data 201 may also be generated at the handset 207. The voice data 201 may include a user's spoken voice, which may be generated simultaneously with the SMS data. Therefore, the SMS data may be generated during a telephone call. However, it is not necessary to initiate a telephone call, or establish a telephone connection in order to generate and transmit the SMS data. Therefore, the SMS data may be generated without first making a telephone call or transmitting voice data 201.

At step 303, the SMS data is transmitted from the handset 207 to the base station 202. The SMS data may be transmitted to the base station 202 via RF signals. The voice data 201 may also be transmitted from the handset 207 to the base station 202.

At step 304, the SMS data is transmitted from the base station 202 to a modem 218. Although not illustrated, the SMS data may be processed by a routing module 204 to route the SMS data to the modem 218 within the gateway 214. The voice data 201 may also be transmitted from the base station 202 to the gateway 214. The voice data 201 may be routed by the routing module 204 to the MTA 216 within the gateway 214.

At step 305, the SMS data is transmitted from the modem 218 to the IP network 220. The IP network 220 may be the Internet and may include networks which are wired, wireless, etc. The voice data 201 may also be transmitted from the gateway 214 to the IP network 220. The voice data 201 and the SMS data may be transmitted back to another handset associated with the base station 202 or to any other telephone or a computer connected to the IP network 220.

Figure 3B:
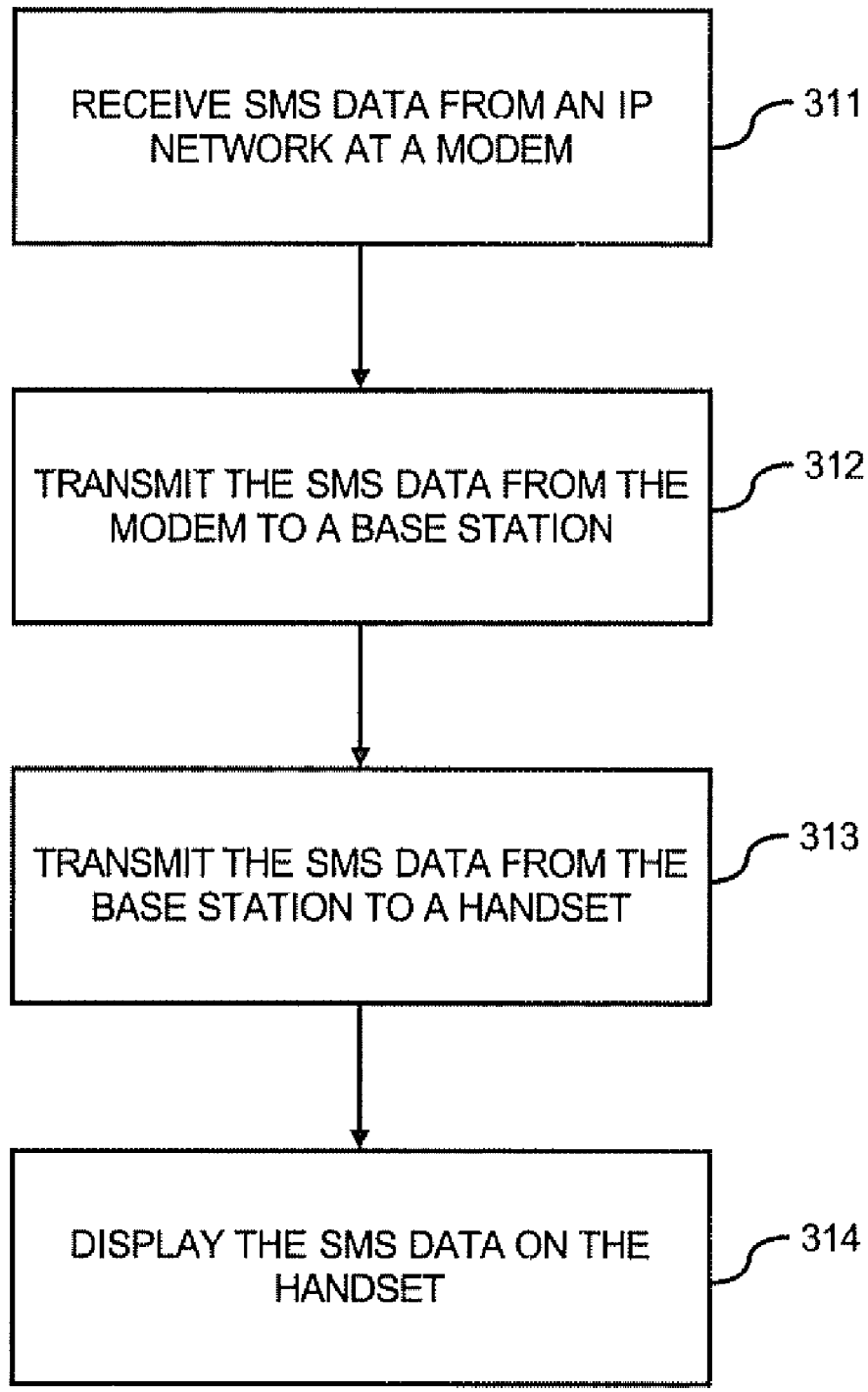
FIG. 3B illustrates a flow chart of a method for receiving SMS data from an IP network on a cordless telephone system and transmitting the SMS data to a handset, according to an embodiment.

FIG. 3B depicts a flow chart of an illustrative method 310 for receiving SMS data from an IP network on a cordless telephone system and transmitting the SMS data to a handset. The method 310 is described with respect to FIGS. 2A and 2B by way of example and not limitation and it will be apparent that the method 310 may be used in other systems. Moreover, it will also be apparent to a person having ordinary skill in the art that certain steps in the method 310 are optional and, similarly, that additional steps may be inherent or added to the method 310.

At step 311, SMS data is received at a modem 218 from an IP network 220. The modem 218 may contain a routing module or a device similar to the routing module 204 for distinguishing between IP data 203 and other forms of data, such as voice data 201.

At step 312, the SMS data is transmitted from the modem to the base station 202. The SMS data may be routed directly to the base station 202, thereby bypassing the MTA 216. In one example, the SMS data may be received by the routing module 204. However, in other examples the SMS data may be received by the IP application host 211 or transmitted directly to the handset 207, 209, or 211.

At step 313, the SMS data is transmitted from the base station 202 to the handset 207, 209, or 211. For example, the handset 207, 209, or 211 and the base station 202 may use a DECT 6.0 protocol to communicate there between.

At step 314, the SMS data is displayed on the handset 207, 209, or 211. For example, the handset 207, 209, or 211 may include a display device to allow a user to read and write instant messages and/or text messages.

FIG. 4 illustrates a block diagram of a general purpose system 400 that is operable to be used as a platform for the components of the telephone system 200 described above. The general purpose system 400 may be used as, or may comprise a part of the handset 207, the base station 202, or the gateway 214. Furthermore, components may be added or removed from the general purpose system 400 to provide the desired functionality.

The system 400 includes a processor 402, providing an execution platform for executing software, such as the IP application 210. For example, the handset 207 may comprise a processor 402 for running an SMS application. Commands and data from the processor 402 are communicated over a communication bus 404. The system 400 also includes a main memory 406, such as a Random Access Memory (RAM), where software may reside during runtime, and a secondary memory 408. The secondary memory 408 may include, for example, a nonvolatile memory where a copy of software, such as the IP application 210, is stored. In one example, the secondary memory 408 also includes ROM (read only memory), EPROM (erasable, programmable ROM), EEPROM (electrically erasable, programmable ROM). However, the secondary memory 408 is optional and may not be included in systems and methods described herein.

The system 400 includes I/O devices 410. The I/O devices may include a display and/or user interfaces comprising one or more I/O devices 410, such as a keyboard, a mouse, a stylus, and the like. For example, the I/O devices 410 may include a number pad and/or a keyboard on the handset 207 for entering telephone numbers and/or SMS data, such as text messages and instant messages. A communication interface 414 is provided for communicating with other components. For example, the communication interface 414 may include RF transmitters and receivers on the handset 207 and the base station 202 for sending and receiving RF signals. The communications interface 414 may also include the means for communicating between the base station 202 and the gateway 214 when these components are not integrated, as described above. The communications interface 414 may facilitate connection to a network.

One or more of the steps described herein are operable to be implemented as software stored on a computer readable medium, such as the memory 406 and/or 408, and executed on the system 400, for example, by the processor 402.

The steps are operable to be embodied by a computer program, which can exist in a variety of forms both active and inactive. For example, they exist as software program(s) comprised of program instructions in source code, object code, executable code or other formats for performing some of the steps. The codes described above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A cordless telephone system comprising:
a base station operable to connect to an internet protocol (IP) network; at least one handset running a short messaging service (SMS) application, the at least one handset operable to transmit and receive both voice data and SMS data generated by the SMS application to and from the base station, a routing module configured to transmit the voice data from the base station to a multimedia terminal adapter (MTA), and to transmit the SMS data from the base station to the modem,
wherein the voice data is transmitted from the base station via the MTA to the IP network: and the SMS data is transmitted from the base station via a modem to the IP network, and the routing module is operable to bypass the MTA by sending the SMS data directly to the modem.

2. The cordless telephone system of claim 1, wherein the at least one handset is operable to transmit the SMS data to the base station and the base station is operable to transmit the SMS data to the IP network via the modem while the at least one handset is connected to another user during a telephone call.

3. The cordless telephone system of claim 1, wherein the at least one handset is operable to transmit the SMS data to the base station and the base station is operable to transmit the SMS data to the IP network via the modem without the at least one handset being connected to another user via a telephone call.

4. The cordless telephone system of claim 1, wherein the cordless telephone system is operable to connect to, and operate on, a plain old telephone service (POTS) network.

5. The cordless telephone system of claim 1, wherein the at least one handset comprises a plurality of handsets each running an SMS application and, wherein the base station runs an SMS host application configured to receive SMS data from the plurality of handsets and transmit the SMS data to the plurality of handsets without accessing the IP network.

6. The cordless telephone system of claim 1, wherein the base station, the MTA, and the modem are integrated into a single unit.

7. The cordless telephone system of claim 1, wherein the SMS data includes at least one of instant messages (IM) and text messages.

8. A method of transmitting short messaging service (SMS) data over a cordless telephone system comprising: running an SMS application on a handset; generating the SMS data with the SMS application running on the handset; transmitting the SMS data from the handset to a base station for the handset; transmitting the SMS data from the base station to a modem in connection with the base station; transmitting the SMS data from the modem to an IP network-generating voice data at the handset; transmitting the voice data from the handset to the base station; transmitting the voice data from the base station to a multimedia terminal adapter (MTA); transmitting the voice data from the MTA to the IP network; and routing the SMS data received at the base station directly to the modem and bypassing the MTA.

9. The method of claim 8, wherein transmitting the SMS data from the handset to the base station comprises:
transmitting the SMS data to the base station while the handset is connected to another user during a telephone call.

10. The method of claim 8, wherein transmitting the SMS data from the handset to the base station comprises:
transmitting the SMS data to the base station without the handset being connected to another user during a telephone call.

11. The method of claim 8, further comprising:
running an SMS host application on the base station, wherein the SMS host application is configured to receive the SMS data generated by the SMS application on the handset and transmit the SMS data to another handset without accessing the IP network.

12. The method of claim 8, wherein the base station, the MTA, and
the modem are integrated into a single unit.

13. The method of claim 8, wherein generating the SMS data comprises: generating at least one of an instant message (IM) and a text message.

14. The method of claim 8, further comprising:
receiving the SMS data at the MTA from an IP network; transmitting the SMS data from the MTA to the base station; transmitting the SMS data from the base station to the handset; displaying the SMS data on the handset; receiving voice data at the MTA from the IP network; transmitting the voice data from the MTA to the base station; transmitting the voice data from the base station to the handset; and presenting the voice data to a user of the handset.

15. A base station for a cordless telephone system comprising: an MTA operable to transmit and receive voice data over an IP network; a modem operable to transmit and receive SMS data over the IP network; and a routing module operable to receive the voice and SMS data from a plurality of handsets and route the voice data to the MTA and the SMS data directly to the modem, wherein the routing module is operable to bypass the MTA by sending the SMS data directly to the modem.

* * * * *